US006934561B2

(12) United States Patent
Burrus, IV

(10) Patent No.: US 6,934,561 B2
(45) Date of Patent: Aug. 23, 2005

(54) CABLE OR MODULE IDENTIFICATION APPARATUS AND METHOD

(75) Inventor: Philip H. Burrus, IV, Lilburn, GA (US)

(73) Assignee: Motorola, Inc., Schaumburg, IL (US)

( * ) Notice: Subject to any disclaimer, the term of this patent is extended or adjusted under 35 U.S.C. 154(b) by 539 days.

(21) Appl. No.: 09/961,049

(22) Filed: Sep. 24, 2001

(65) Prior Publication Data

US 2003/0060243 A1 Mar. 27, 2003

(51) Int. Cl.$^7$ .............................. H04M 1/00; H04B 1/38
(52) U.S. Cl. ........................ 455/559; 320/106; 307/125
(58) Field of Search .................. 455/418, 420, 455/550.1, 559, 572–573; 307/112, 125; 320/106–110, 112, 125; 324/66

(56) References Cited

U.S. PATENT DOCUMENTS

| | | | |
|---|---|---|---|
| 4,006,396 A | | 2/1977 | Bogut |
| 5,184,059 A | * | 2/1993 | Patino et al. ............... 320/125 |
| 5,818,197 A | * | 10/1998 | Miller et al. ................ 320/107 |
| 5,822,427 A | | 10/1998 | Braitberg et al. |
| 6,337,557 B1 | * | 1/2002 | Kates et al. ................ 320/112 |
| 6,509,659 B1 | * | 1/2003 | Carroll et al. ............. 307/125 |
| 6,661,805 B1 | * | 12/2003 | Romano et al. ............ 370/450 |

* cited by examiner

Primary Examiner—George Eng
(74) Attorney, Agent, or Firm—Philip H. Burrus, IV

(57) ABSTRACT

This invention includes a universal base unit having a plurality of cables, each corresponding to a unique electronic host device. The cable includes a capacitor having a value corresponding to a particular electronic host device. The capacitor is coupled in series with a resistor to ground in the universal base unit. The cable further includes a unique mating connector for coupling to the electronic host device. The universal base unit identifies the cable by actuating a step function across the capacitor-resistor network, causing an exponentially decaying waveform. A microprocessor in the host device then measures the width of the waveform to determine the identity of the cable or host device. The system allows a user to carry a single power supply or universal base unit with multiple cables as opposed to having to transport a different accessory for each electronic device.

9 Claims, 6 Drawing Sheets

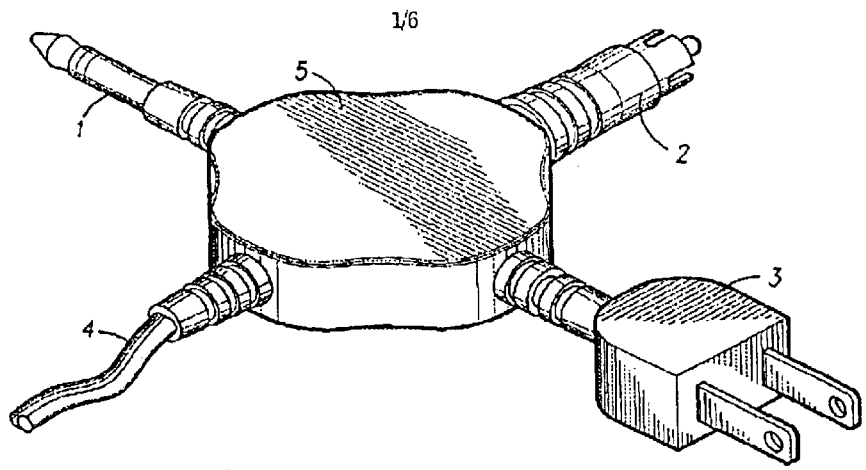
-PRIOR ART-
FIG. 1
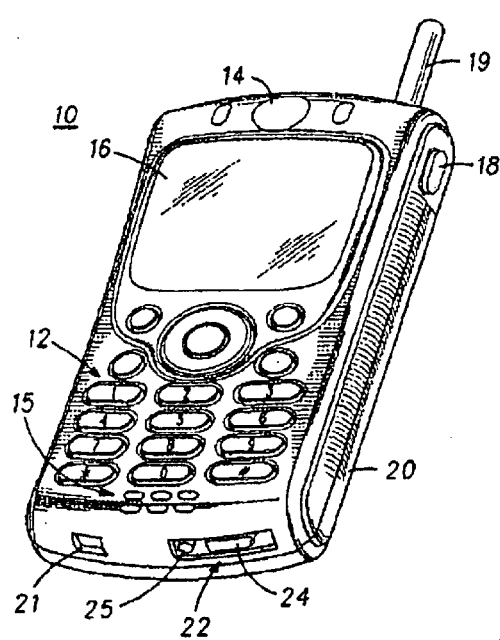
-PRIOR ART-
FIG. 2
FIG. 4
-PRIOR ART-
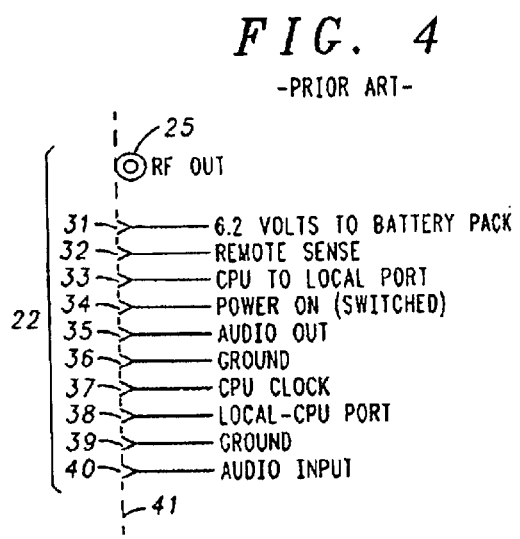

-PRIOR ART-

-PRIOR ART-

-PRIOR ART-

-PRIOR ART-

US 6,934,561 B2

CABLE OR MODULE IDENTIFICATION APPARATUS AND METHOD

BACKGROUND

1. Technical Field

This invention relates generally to interfacing systems for portable electronic devices, and more particularly to an apparatus for providing a power and communications interface between a portable electronic device, selected from a variety of such devices, to a common base unit.

2. Background Art

Electronic devices are being developed today at a dizzying rate. Everywhere you look, people are carrying cellular phones, compact disc (CD) players, personal digital assistants (PDAs), pagers, radios, MP3 players, and laptop computers. This proliferation of electronic devices is especially true in the case of cellular telephones. According to the Cellular Telecommunications Industry Association (CTIA), cellular telephone usage in the United States increased 27% between 1999 and 2000. As of December 2000, there were over 109 million cellular subscribers in the United States alone.

There are two problems with this proliferation of electronic devices, however: First, they seem to all use different power supplies with different connectors. Nothing is more frustrating than packing for a trip and having to leave your swimming suit at home because your suitcase is full with four different power supplies for your computer, PDA, phone and CD player.

There is a reason for the various power supplies and connectors. Each host device has different power requirements. For example, a laptop computer consumes much more energy than does a cellular phone. The extra power is needed to run motors like disk drives and CD-ROM players that the phone does not have. Additionally, the laptop may have to illuminate a 120 square inch screen continuously, while the cellular phone need only light a 4 square inch screen occasionally.

Another reason for the differing power supplies are the batteries associated with each device. Different rechargeable batteries have differing charging requirements. For example, a nickel-metal hydride battery may charge to a termination of 6 volts, while a single-cell Lithium-Ion battery can only be charged to 4.2 volts. If the lithium battery were charged with a nickel charger, the lithium battery could become "overcharged" when the voltage exceeded 4.2 volts. Under these conditions, the reliability of lithium cells can be compromised.

The second problem is that as the sophistication of electronic devices increases, data ports to and from the electronic devices are required to transmit data for remote antenna connections, voice and data communications, and most importantly, what is known as "hands free" operation. These functions generally require a physical connection between the phone unit and parts or devices found in a vehicle or accessory. These data ports are typically seem to be manufacturer specific—each manufacturer has it's own unique connector.

The two problems are essentially the same: every portable device has a unique connector for power and data. Designing a "universal" device to work with a plurality of devices is thus problematic.

One solution to the "multiple-device, multiple-accessory" problem is the multi-connector. Referring to FIG. 1, illustrated therein is a multi-prong adaptor 5 commonly available at electronics stores. Such an adapter 5 generally has several different prongs 1,2,3 coupled in parallel to a power cord 4. The power cord 4 may thus be connected to three different types of connectors. The problem with such a device is that the power delivered by the supply is the same no matter what connection you are using. If the power supply is a 6-volt supply, you still cannot charge a single-cell lithium battery with this connector (even if it does fit) because the battery performance may be compromised. Additionally, these connectors generally have no provisions for data communication.

Another possible solution made specifically for cellular phones is the car kit. Cellular phone manufacturers have made available car kits to provide both charging and data communication, as well as hands-free operation. These kits include physical hardware to retain the phone in the vehicle including an attachment for establishing an electrical connection to the phone and various types of remote speakers, microphones, power supplies and antenna connections. These kits also include complex electronics modules to provide battery charging, audio amplification and digital communication interface to the phone unit.

The problem with these car kits is that they are device specific. In other words, you cannot use a Nokia accessory with a Motorola phone. As a result, car kits do not provide any form of universal connection and are neither physically nor electrically interchangeable. Additionally, device specific car kits can be expensive, with costs of the accessory rivaling the cost of the phone itself.

This situation has caused a hardship on cellular telephone users and affected the marketplace for new equipment. Fleet users, for example, cannot provide a universal car kit connection for the variety of phones they may acquire. Users are forced to abandon their investment in the car kit when purchasing new models of telephones. These limitations have prevented businesses such as car rental agencies from providing users with means to use their car phones in rented vehicles. Further, the high cost of these car kits has caused many users to operate hand-held units while driving, an unsafe condition which is subject to increasing governmental concern and regulation.

There is thus a need for an improved interface system capable of coupling to and identifying a plurality of portable electronic devices.

BRIEF DESCRIPTION OF THE DRAWINGS

FIG. 1 is a prior art multiple-terminal connector.

FIG. 2 shows a contemporary cellular telephone and its interconnection port.

FIG. 4 is a tabulation of the electrical functions associated with a typical input/output connector for a contemporary cellular telephone.

DETAILED DESCRIPTION OF THE INVENTION

Figure 3A:
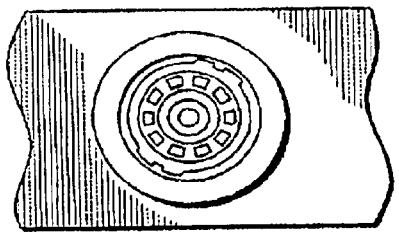
FIGS. 3A–3F show examples of a variety of hand-held cellular telephone input/output physical interfaces.
Figure 3B:
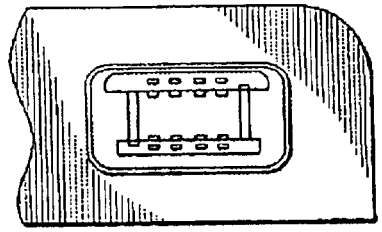
Figure 3C:
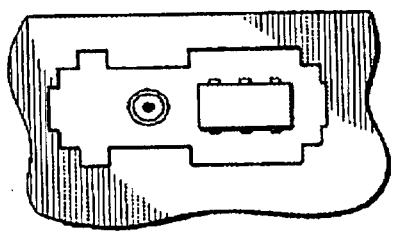
Figure 3D:
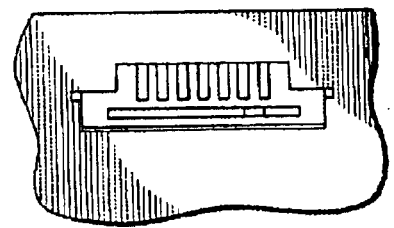
Figure 3E:
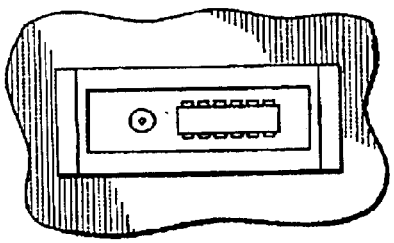
Figure 3F:
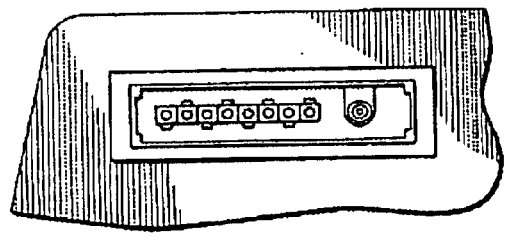
Figure 5:
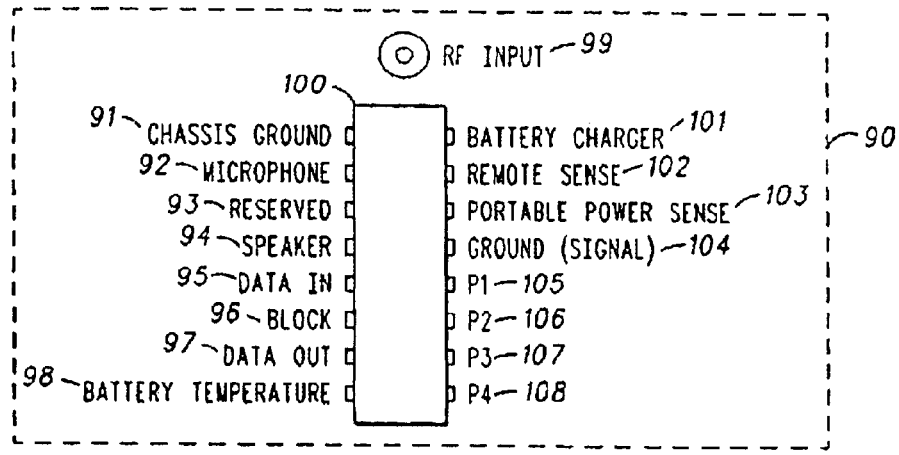
FIG. 5 is a tabulation of an exemplary connection assignment discipline associated with a typical input/output connector for a contemporary cellular telephone.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to FIG. 2, illustrated therein is one embodiment of a conventional hand held cellular telephone 10. Such telephones 10 employ a wide variety of physical interfaces. There are a large number of models of cellular telephones in existence and each physical interconnection and electrical interface is unique to a manufacturers specific model.

Cellular phone 10 includes a typical array of features for such devices. Keypad 12 allows dialing and other data processing/generating functions. An earphone 14 is positioned at one end while a microphone/speaker 15 is located at the other end. Liquid crystal display (LCD) 16 provides a compact presentation of limited information to the user while switch 18 is for on/off control. Antenna 19, which may be either internal or external, communicates with the tower infrastructure when the phone 10 is in transmission. A battery pack 20 is attached to the phone 10 and requires periodic recharging when phone 10 is coupled to a charger or power supply. Some phones 10 include a release button 21 for decoupling from accessories.

Accessories are connected to the phone 10 by a plug 22 at one end of the phone 10. The particular connector of FIG. 2 is a male connection with a center extension 24 having arrays of electrical contacts on the upper and lower surfaces thereof. Additionally, an RF coaxial type element 25 is included as a portion of plug 22. Note that not every cellular telephone has an RF connector even though one is included in the example shown as element 25. In conventional use, the phone 10 may be stored in a desktop charger so as to couple plug 22 with a complementary connector in the charger.

FIGS. 3A through 3F show a series of examples of physical interconnections for cellular telephones. That is, FIGS. 3A to 3F present typical examples of cylindrical, rectangular, spring contact and pad type connections used in common cellular phone units, usually in the base plate thereof. From this, it is apparent the wide range of configurations and physical sizes prohibits a common interconnection to a base unit or the like. Cellular phones are expected to use even smaller connectors as the units are further miniaturized in the future.

Electrical interfaces to the various phone units present still more problems. For instance, as stated, there are a wide variety of battery types and voltages used in the rechargeable battery packs incorporated into the phone units. Further, the electrical phone signals exist in a wide variety of voltage levels and signal coding schemes. Referring now to FIG. 4, a typical example of the functions assigned to the pins of a conventional phone input/output connector 22 containing connector contacts or pins 31–40 is shown. Note that connector 22 might or might not represent the specific pin function assignments for connector 22 shown in FIG. 2. While there is a certain amount of commonality of functions associated with many cellular phones, the particular function assigned to a given pin often varies, as does the number of functions, the number of pins and their physical configurations.

Connector 22 is shown with a coaxial connector 25 to provide for direct connection to the RF output. Pin 31 is used for battery charging from the remote adapter, while pin 32 is used to detect the presence of the remote adapter and pin 33 is used for digital communication to the remote adapter. Pin 34 is used to signal the remote adapter that phone power is on. Pin 35 has the low level audio output signal to drive a remote speaker amplifier. Pins 36 and 39 provide internal ground connections. Pin 37 provides the CPU clock signal, pin 38 is the local to CPU communications port, and pin 40 is used to receive the signal from the remote microphone.

Figure 6:
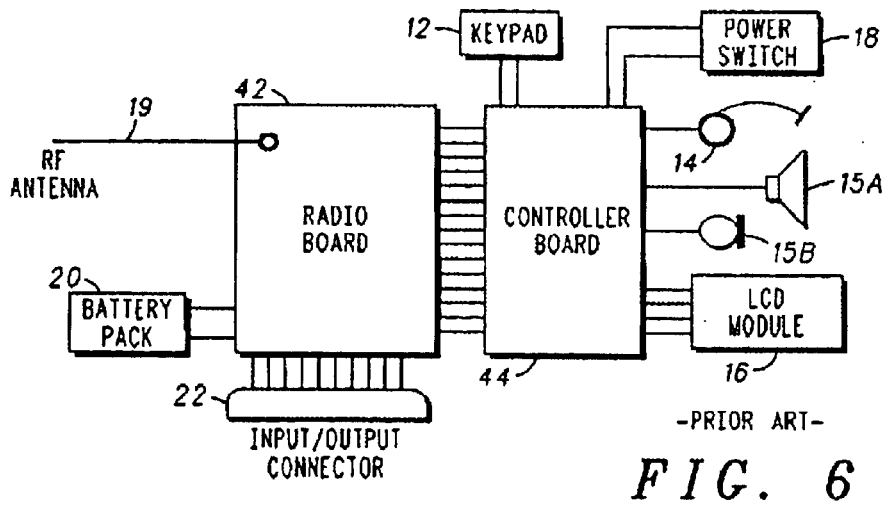
FIG. 6 is a block diagram of a typical hand-held cellular phone unit.

The internal architecture of a typical phone unit is shown in block diagram form in FIG. 6 where further details of the interconnections with the internal block functions of the phone with the input/output connector 22 described above are presented. The peripheral elements of FIG. 6 correspond to their counterparts of FIG. 2. Note that the speaker 15A is separate from the microphone 15B but both are housed at that end of unit 10. This is to prevent production of the ringing sound directly into the ear of the user. Radio board 42 contains the radio frequency signal handling components whereas a computer including a conventional CPU with its input/output interfaces is contained in board 44. The CPU of board 44 handles all the host functions associated with the components shown.

Figure 7:
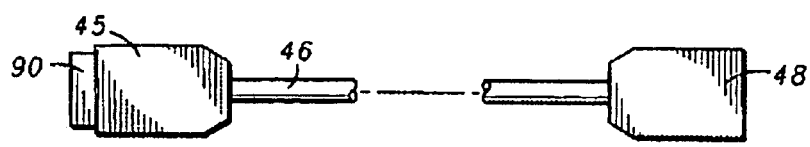
FIG. 7 is a cable assembly for coupling accessories to electronic devices.

It is possible to create a custom tailored adapter cable configured internally to transpose connections between the various interconnection disciplines along the lines of those shown in FIG. 3. It has long been known in the art that cables may be manufactured with connectors of different types as illustrated in FIG. 7. Referring now to FIG. 7, illustrated therein is a cable 46 with different connectors 45,48 on each end. A universal connector 45 or plug is arranged in accordance with a predetermined assignment of pin functions. On the opposite end of cable 46 is a connector or plug 48 configured to attach to a particular electronic device. That is, connector 48 is different for each differently configured connector on a cellular phone. The conductors within cable 46 are connected within plugs 45 and 48 so that the pin functions are matched.

The problem with such a cable 46 linking a specific electronic device and a universal base unit is that the universal base unit must be able to identify just what specific device is attached at the other end. One object of this invention is an apparatus and method for identifying an electronic device via a cable having a universal connector on one end and a device specific connector on the other. This invention has numerous advantages over the prior art, including simpler implementation with control units and microprocessors, reduced cost, increased breadth, and expanded flexibility. These advantages will be discussed in more detail below. First it is well to examine the prior art.

One solution to the "identification issue" is taught by U.S. Pat. No. 5,822,427, issued to Braitberg et al. Referring now to FIGS. 8A–8D, illustrated therein is the Braitberg et al.

solution for determining the make and model of an electronic device coupled at the end of a cable. This solution utilizes the cable adapter to identify itself to a universal base unit. This is accomplished by a number of pins reserved at the processor or common end of the cable connector for use as a programming device. An electrically conductive structure 50 containing a plurality of physically and electrically interconnected pins 51–55 is inserted into and retained by connector body 58 as seen in FIG. 8B. A short connecting link 56 extends above ridge or shoulder 57 above the connector body 58 when connector 50 is inserted therein. These links are preferably clipped in a binary pattern to produce the identification data for the processor 154 so that it can determine the type of cellular phone attached to the other end of the cable.

Figure 8A:
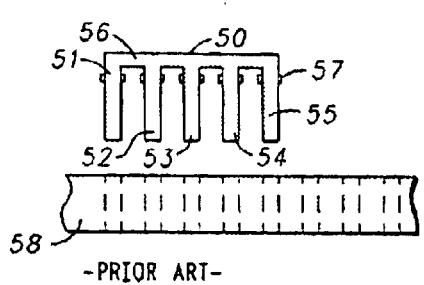
FIGS. 8A–8D illustrate a prior art method of embodying a coded adapter cable connector.
Figure 8C:
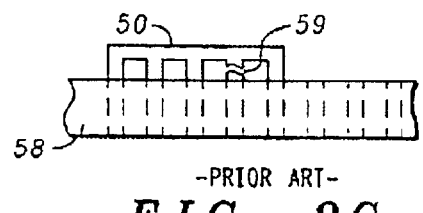
Figure 8B:
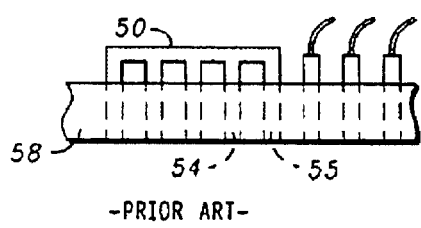
Figure 8D:
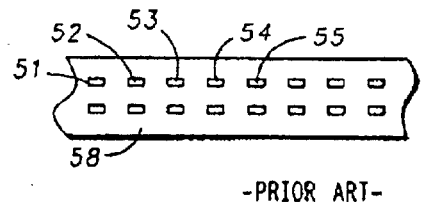

For example, if link 54 is clipped as shown as gap 59 in FIG. 8C, the resulting circuit to pin 54 is opened. Thus electrical current sensing of the pins 51–55 in FIG. 8D will reflect the open circuit status of pin 54. The connector body 58 includes conventional, well-known means (not shown) for retaining the end of the clipped contact in place so as to prevent it from falling out or sliding back into the connector body when the connectors are coupled.

The problem with this solution is that many pins must be used for nothing other than identification. For example, to identify nine different phones, four extra pins must be dedicated to the universal connector solely for the identification function. These excess pins make the connector large, unwieldy and expensive to manufacture.

Braitberg et al. teaches other solutions, including a memory device being stored in the cable, as is taught in copending application Ser. No. 09/730,691, filed Dec. 6, 2000, assigned to Motorola, Inc. Again, this solution can be expensive and difficult to manufacture. Semiconductor devices are quite costly and difficult to assemble in connector housings and cables. Such manufacture typically requires hand soldering, which increases labor costs as well as material costs.

Figure 9:
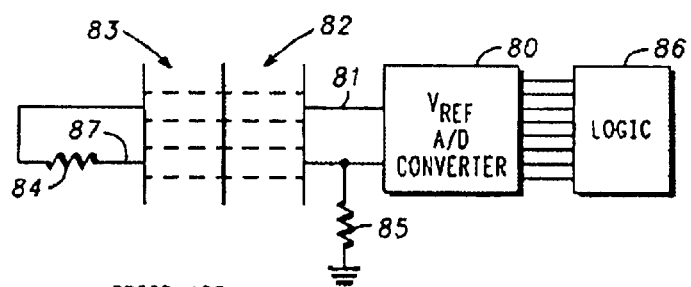
FIG. 9 is a prior art block diagram of a battery characteristic detector.

Braitberg et al. teaches yet another solution, as illustrated in FIG. 9. In this embodiment, analog to digital (A/D) converter 80 provides a reference voltage (Vref) to line 81 that is presented to the mating connector pins 82 and 83. The voltage produces a current through the circuit consisting of resistor 84 (Rprog) and resistor 85 (Rfixed) in a half-bridge configuration providing a voltage at pin 87 which is connected to the signal input of A/D converter 80. A 6 bit A/D converter can provide 64 possible binary codes to logic 86. The value for each Rprog resistor 84 is calculated from the equation: Vout*Rfixed/(Vref−Vout).

This particular solution is a extremely similar on a resistor-based identification scheme first disclosed by Bogut in U.S. Pat. No. 4,006,396, issued in 1977, entitled "Universal Battery Charging Apparatus", assigned to Motorola, Inc. The problem with the solution of Braitberg et al. is that it can also be costly and cumbersome. The Braitberg et al. solution requires a dedicated analog to digital (A/D) converter, dedicated voltage reference and two resistors. These components can be as expensive as microprocessors. Additionally, to accommodate a wide variety of phones, both the voltage reference and the resistors must be precision components, which further adds to the cost. Another issue is that resistors are difficult to incorporate into semiconductor devices. Thus, if one desired to incorporate the resistors into an integrated circuit chip, the cost would soar as the resistors would most likely need to be laser trimmed.

Figure 10:
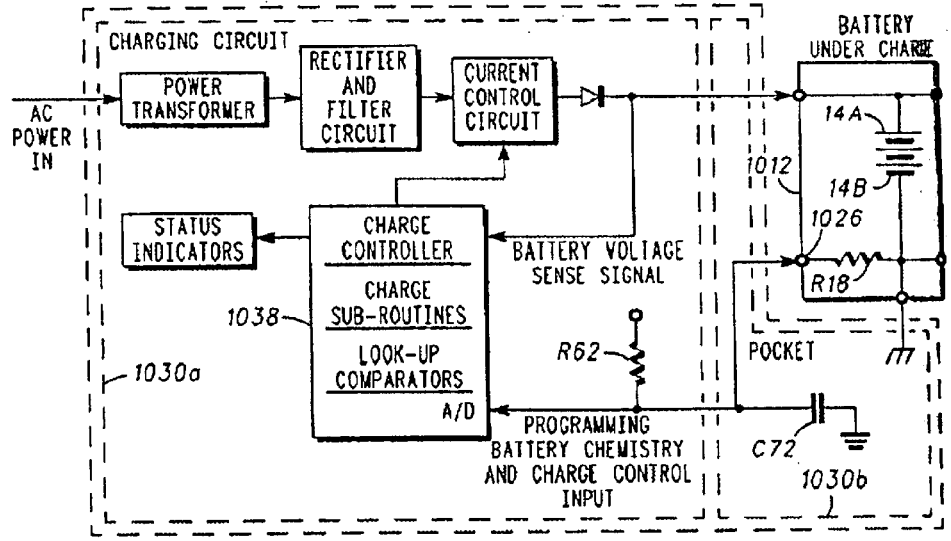
FIG. 10 is a prior art block diagram of an intelligent battery charging system.

Another prior art solution is taught in commonly assigned U.S. Pat. No. 5,184,059, issued to Patino et al., entitled "Expanded Battery Capacity Identification Scheme and Apparatus". Referring now to FIG. 10, illustrated therein is this solution. The microprocessor 1038 is either connected to or includes conventional analog-to-digital (A/D) converter functions or the like. As is known, the microprocessor 1038 is programmed to periodically measure the value of voltage connected to the A/D input. To form a charging algorithm sensing circuit, the resistor R18 is connected to the negative charger contact 1026 so that a predetermined external impedance (or voltage source) may be connected to complete a voltage divider with a pull-up resistor R62. In this manner, predetermined values of voltage at the negative charger contact 1026 can be calculated to provide one factor relating to the battery capacity. It is appreciated that the measured voltage Vm is directly related to the resistance of the connected resistor R18 in accordance with the usual voltage divider relationship:

$$Vm=(B.sup.+)R18/(R62+R18). \qquad \text{[equation 1]}$$

where

Vm equals the measured voltage at the negative battery charger contact 1026 or the A/D input(line);

B.sup.+=the supply voltage (i.e. as may have also just previously been measured with the aid of the A/D converter) at the A/D input;

R62 equals the known pull-up resistance internal to the charging circuit 1030a;

R18 equals the unknown resistance, not necessarily associated uniquely with a particular capacity. After solving for the resistance of R18, one factor relating to the battery capacity can thus be determined.

The Patino et al. solution utilizes a capacitor to expand the present capability of battery capacity sensing and to allow for radio family type differentiation. This is accomplished by utilizing the non-ideal presently coded resistor implementation and a coded capacitor C72 within the charger pocket 1030b. The coded capacitor C72 is connected in parallel with the coded resistor R18 when the battery 1012 is inserted into the pocket 1030b. The coded capacitor C72 is uniquely coded for each radio family type, wherein a 47 uF may denote a type A radio, 27 uF may denote a type B radio, and 68 uF may denote a type C radio.

Figure 11:
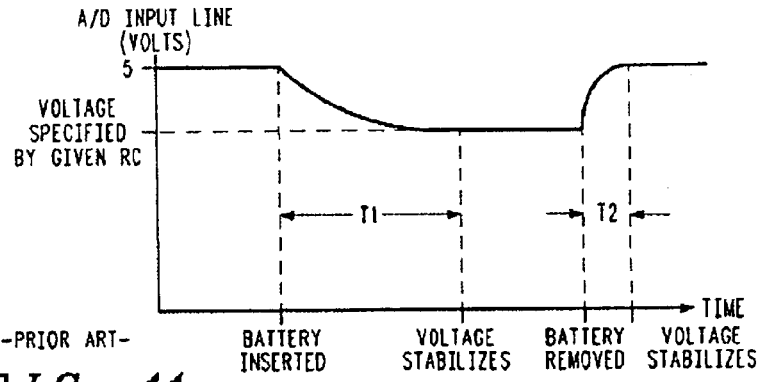
FIG. 11 is a voltage stabilization curve associated with the prior art system of FIG. 10.

Referring now to FIG. 11, a time constant T1=R18.times.C72 developed by the coded resistor R18 and capacitor C72 has to elapse before the voltage Vm is stabilized enough for the resistance of the coded resistor R18 to be measured. This time constant provides a second factor which is also related to the battery capacity, aside from relating to the radio family type. From determining the time constant alone or in combination with the resistance value of the coded resistor R18, the battery capacity and the family type of the associated radio can be identified by the microprocessor 1038 accessing its look-up table stored in memory.

The problem with the Patino et al. solution is that it requires a connection between the identifying capacitor and the resistor embedded in the battery. Additionally, this particular solution is only amenable to electronic devices and batteries having coding resistors stored therein. As coding resistors were patented until the expiration of the Bogut patent, only the patent holder and licensees were able to include such resistors in their products. Consequently, some user's phones would not work with this particular solution.

One object of the present invention is to provide an adapter cable with a universal interface as a common connector at one end but with that cable provided with a suitable connector at the other end to attach to a particular connector configured to another type of mating connector. The present invention further contemplates the creation of a plurality of pocket adapter devices, each pocket adapter device being adapted to establish a physical and electrical interconnection between a particular model of cellular telephone and a common base unit.

One object of the present invention is to provide a method of identifying a cable having a universal connector on one end and a device specific connector on the other end. The method has advantages over the prior art in that it is lower cost, offers a broader spectrum of identification and is easily incorporated into semiconductor devices. The invention includes a universal base unit that has a universal connector. Multiple cables may be provided, each having a universal connector (for mating to the universal unit) and an electronic device-specific connector for mating to an electronic device.

Figure 12:
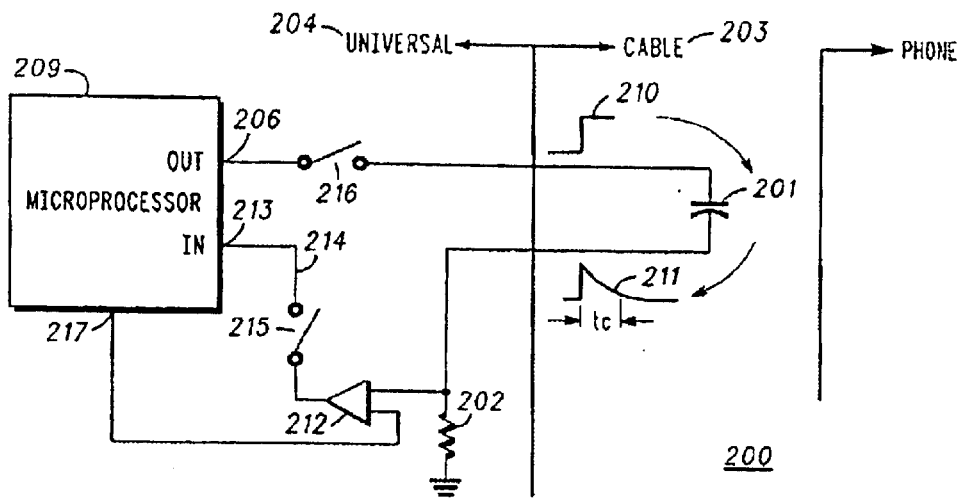
FIG. 12 is a schematic block diagram of an intelligent accessory system in accordance with the invention.

Referring now to FIG. 12, illustrated therein is a schematic block diagram in accordance with the present invention. The circuit 200 includes a capacitor 201 in the cable 203. The capacitor 201 has a value that corresponds to a specific electronic device (not shown). The capacitor 201 is coupled in series with a resistor 201 to ground. While the capacitor 201 is disposed in the cable 203, the resistor 201 is disposed in the universal device 204. When the cable 203 is attached to the universal device 204, the microprocessor 209 of the universal device 204 takes the capacitor connection 205 and applies a step function 210 by toggling an output 206 from low to high. When this occurs, an exponentially decaying, or "shark-fin", function 211 is created across the resistor 202.

The shark-fin function 211 is then coupled back into the microprocessor 209. An optional comparator 212 provides clean transitions that are easily readable by an input 213 of the microprocessor 209. A Schottky-type latch may also be added to ensure clean transitions. Pull-up resistors may be added to both the output 206 and input 213 of the microprocessor 209. The microprocessor 209 is then able to detect the width of the shark-fin 211 by comparing the high to low transition seen the input 213 to the internal clock. The width of the shark-fin 211 corresponds to the identity of the electronic device coupled at the end of the cable 203.

In one preferred embodiment, the output line 205 and the input line 214 may be switched with optional transistors 215,216. In this manner, the identification lines 205,214 are coupled to the microprocessor 209 only until the identification has been made. They may then be switched to other functions. This fact that dedicated lines are not required allows additional functionality for the user from the same microprocessor.

To recap, the microprocessor 209 senses cable 203 attachment by conventional means, including pull-up resistors, floating inputs becoming non-floating, etc. Once the cable 203 connection is sensed, the microprocessor 209 switches the output 206 from low to high. This step function 210 is applied to the capacitor 201—resistor 202 combination. The microprocessor 209 then waits for the corresponding input 213 to go low. When this occurs, the microprocessor 209 calculates the time between output trigger (output transitioning from low to high) and input trigger (input transitioning from high to low). This time corresponds to a particular electronic device or cable.

Suitable microprocessors for the invention include those like the uPD78F0034 series manufactured by NEC. This processor includes an on-board voltage reference (shown as element 217 in FIG. 12) in the event that a comparator is used for cleaner switching. A typical clock frequency that this microprocessor operates comfortably in is 4 MHz. At this frequency, the microprocessor is able to differentiate switching edges with an on-board interrupt at a resolution of 2 microseconds. Alternatively, a polling subroutine (a routine that constantly polls the input until a transition is seen) is able to differentiate switching edges with a resolution of 5 microseconds. It will be clear to those in the art that numerous microprocessors, including much more powerful units running at higher frequencies may be used for better resolution.

In the exemplary embodiment described in the preceding paragraph, a first cellular phone may correspond to a 5 microsecond delay, while a second cellular phone may correspond to a 10 microsecond delay, and so on. Assuming a 10 k resistor to ground, the first phone would need a 1 nF capacitor, while the second phone would need a 2 nF capacitor, and so on.

The invention takes advantage of the well-known exponential decay associated with resistor-capacitor networks. The voltage decays exponentially according to $Vi*(1-e^{-t/RC})$, where Vi is the initial voltage, R is the resistor value and C is the capacitor value. The "e" represents the exponential function. Assuming that one desires to measure the time it takes to reach 50% of it's initial value (to trigger a comparator with a reference equal to half the supply), the math progresses as follows:

$$Vo=Vi*(1-e-t/RC) \qquad \text{[equation 2]}$$

We want:

$$Vo=Vi/2 \qquad \text{[equation 3]}$$

Thus:

$$Vi/2=Vi*(1-e-t/RC) \qquad \text{[equation 4]}$$

$$\tfrac{1}{2}=1-e-t/RC \qquad \text{[equation 5]}$$

$$e-t/RC=\tfrac{1}{2} \qquad \text{[equation 6]}$$

$$-t/RC=ln(\tfrac{1}{2}) \qquad \text{[equation 7]}$$

$$C=t/(R*ln(\tfrac{1}{2})) \qquad \text{[equation 8]}$$

Thus for t=5 microseconds, R=10 k, C=0.72 nF. Rounding this off to 1 nF, a 10 microsecond delay would require a 2 nF cap, and so on.

The invention provides several advantages over the prior art. To begin, precision resistors and voltage references are not required. Neither are bulky connectors with large numbers of pins. The invention provides a low-cost, easily manufacturable means of identifying a universal cable, in that a simple capacitor is the only identifying component in the cable. Additionally, it is well known in the art that capacitors are relatively simple to construct on semiconductor wafers using technologies such as complimentary metal-oxide semiconductor (CMOS) fabrication techniques. As this is the case, this invention is easily combinable with memory devices, microprocessors, programmable logic devices, and other application specific integrated circuits (ASICs) that may be disposed in the cable. In the event that circuitry is coupled from the electronic device through the cable to the universal device, the identifying capacitor may be disposed in the electronic device as well.

Figure 13:
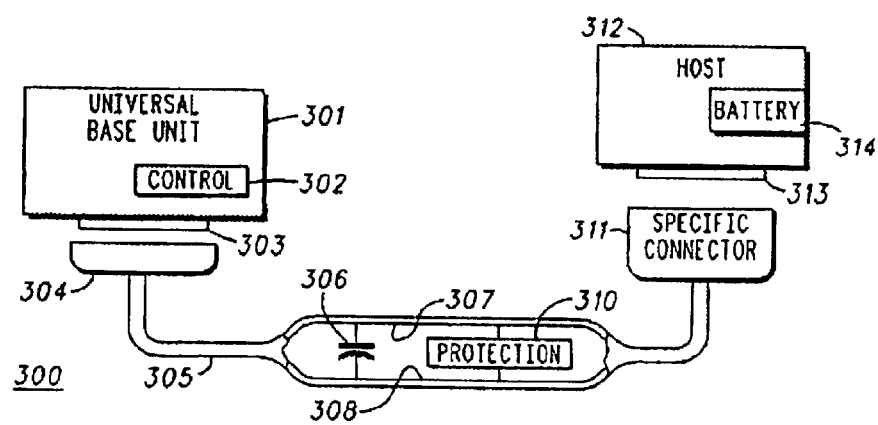
FIG. 13 is one preferred embodiment of an identification apparatus in accordance with the invention.

Referring now to FIG. 13, illustrated therein is an intelligent accessory system 300 in accordance with the invention. A universal device 301 is provided having an accessory circuit (not shown) disposed within. The power conversion circuit could be any number of well known circuits, including a hands-free circuit, answering machine, infrared communications, computer modems, facsimile machines, scanners, bar code readers, digital information processors, fly back regulator, a step-down, or "buck", regulator, a step-up regulator, a buck-boost regulator, a resonant regulator, or similar design. In one preferred embodiment, the accessory circuit is a power conversion circuit comprising a fly back regulator capable of coupling to a wall outlet and converting AC power to DC power. In another preferred embodiment, the accessory circuit is a power conversion circuit comprising a buck regulator capable of coupling to an automotive cigarette lighter adapter.

The universal device 301 also has a control circuit 302 disposed within. The control circuit 302 is capable of configuring the accessory circuit to accommodate the host device 312. Additionally, the control circuit may be capable of tapering, stepping, and ramping voltage and current in specific ways that match the needs of the host device 312.

A cable 305 is provided. The cable 305 can be a conventional cable with a length of wire, or it may be as short as a typical adapter connector. The cable 305 includes a capacitor 306. The capacitor 306 corresponds to a specific host device 312, and may indicate the characteristics of the power requirements of the host device 312. These characteristics include: voltage termination; maximum current; temperature limits; and the like.

The cable 305 couples to the universal device 301 via a universal connector 304 and a mating universal connector 303. The universal connector 304 is standardized so that it may accommodate different power devices. For example, it may be desirable to connect the cable to a power supply while indoors, and then to a cigarette lighter adapter while in the car. If the universal mating connectors are of a standard configuration, the cable will work equally well with both.

In one embodiment, the cable 305 has at least three connecting wires disposed within. A first wire 307 is for carrying current from the universal device 301 to the host device 312. A second wire 308 is a return path for to complete the circuit between power supply and host device. A third wire 309 is a data line for transmitting the shark-fin from the capacitor 306 to the control circuit 302 in the universal device 301.

At the other end of the cable 306, a device specific connector 311 connects with a mating device specific connector 313 on the host device 312. For example, if the host device is a Motorola StarTac Phone, the device specific connector would be the 16-pin connector manufactured by Hirose that is used by Motorola. If the host device is a Palm Pilot, manufactured by Palm Computing, the connector would be the 10-pin connector used in the Palm cradle.

The value of the capacitor 306 is matched with the device specific connector 311. For example when a StarTac cable is coupled to the universal device 301, the capacitor 306 indicates such via the width of the shark-fin. The control circuit 302 configures the universal device 301 to accommodate the host device 312 in accordance with the manufacturer's instructions for the host device 312. The universal device 301 may deliver power to the host device 312 through the power lines 307,308 in the cable 305. By changing the cables, the user is able to reconfigure a single universal device 301 to accommodate many different host devices.

The cable 305 may also contain a protection circuit 310. The protection circuit 310 protects both the host device 312 and it's optional rechargeable battery 314 from overcharge in the event that an electrical component in the universal device 301 fails. For example, if the data line becomes severed such that the capacitor 306 is no longer able to communicate with the control circuit 302, the optional protection circuit 310 ensures that the optional battery 314 in the host device 312 is not overcharged. An example of such a protection device is a shunt regulator as recited in commonly assigned, copending application Ser. No. 09/545,135, filed Apr. 7, 2000, which is incorporated herein by reference.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while a preferred embodiment has included identification of cellular telephones as the host device, it is understood that the invention contemplates identification of other types of devices including pagers, radios, PDAs, laptop computers and the like.

What is claimed is:

1. An intelligent accessory system for identifying a particular electronic device, the system comprising:
  a. a universal base unit having a control circuit, the control circuit having at least one input and at least one output, the universal base unit further comprising a resistor electrically coupled to the at least one input; and
  b. an interface device having both a first connector capable of mechanically and electrically coupling to the universal base unit and a second connector capable of mechanically and electrically coupling to at least one first electronic device, the interface device further comprising a capacitor with a value predetermined to correspond to the at least one first electronic device;
  further comprising a comparator electrically coupled in series between the resistor and the control circuit;
  wherein when the interface device is coupled to the universal base unit the capacitor and the resistor are electrically coupled in series;
  further wherein to identify the at least one first electronic device, the control circuit applies a voltage to the capacitor and measures an exponential voltage decay across the resistor.

2. The system of claim 1, further comprising a protection circuit disposed within the interface device.

3. The system of claim 2, wherein when the at least one first electronic device is identified, the control circuit configures the universal base unit to accommodate the at least one first electronic device.

4. The system of claim 3, wherein the control unit further comprises a means of correlating a predetermined capacitor value to one of a plurality of electronic devices.

5. The system of claim 4, wherein the universal base unit further comprises a power conversion circuit.

6. The system of claim 5, wherein the power conversion circuit is selected from the group consisting of fly back regulator, a step-down, or "buck", regulator, a step-up regulator, a buck-boost regulator, and a resonant regulator.

7. The device of claim 1, wherein the capacitor is disposed on an integrated circuit semiconductor substrate.

8. A universal accessory system, the system comprising:
  a. a control circuit;
  b. a resistance means for providing a resistance value, the resistance means comprising two terminals;
  c. an identification capacitor disposed within an interface means capable of being electrically coupled to the resistance means, the capacitor corresponding to at least one electronic device, the capacitor, when coupled to the resistor, having a characteristic time constant related to the first electronic device; and;

d. the control circuit further comprising:
   i. a switch capable of applying a step function voltage across the identification capacitor;
   ii. means for periodically measuring the voltage across the resistance means;
   iii. means for computing the time elapsed during an exponential decay of the voltage across the resistance means; and
   iv. means for converting the measured stabilizing time to a predetermined identifiable electronic device usage.

9. A method for identifying an electronic device, the method comprising the steps of:

a. providing a universal base unit having a microprocessor, a resistance means coupled electrically to the microprocessor, the universal base unit further comprising a universal connector;

b. providing an interface means having a capacitor corresponding to a first electronic device, the interface means further comprising a universal mating connector and a connector of accommodating the first electronic device;

c. coupling the interface means to the universal base unit;

d. closing a switch to apply a step-function voltage across the capacitor;

e. sensing an exponential voltage decay across the resistor;

f. calculating a time corresponding to the exponential voltage decay across the resistor;

g. associating a set of accommodating parameters associated with the first electronic device based upon the time corresponding to the exponential voltage decay across the resistor.

* * * * *